(12) United States Patent
Unger et al.

(10) Patent No.: US 12,103,603 B2
(45) Date of Patent: Oct. 1, 2024

(54) WHEEL CARRIER BRACKET ASSEMBLY

(71) Applicants: Troy Unger, El Cajon, CA (US);
Thomas Hatch, El Cajon, CA (US);
Jacob A. Hunt, Poway, CA (US)

(72) Inventors: Troy Unger, El Cajon, CA (US);
Thomas Hatch, El Cajon, CA (US);
Jacob A. Hunt, Poway, CA (US)

( * ) Notice: Subject to any disclaimer, the term of this patent is extended or adjusted under 35 U.S.C. 154(b) by 507 days.

(21) Appl. No.: 16/828,105

(22) Filed: Mar. 24, 2020

(65) Prior Publication Data

US 2020/0298917 A1 Sep. 24, 2020

Related U.S. Application Data

(60) Provisional application No. 62/822,941, filed on Mar. 24, 2019.

(51) Int. Cl.
*B62D 43/02* (2006.01)

(52) U.S. Cl.
CPC .................... *B62D 43/02* (2013.01)

(58) Field of Classification Search
CPC ................ B62D 43/02; E05C 17/38
USPC ................ 224/42.21, 42.12, 42.24
See application file for complete search history.

(56) References Cited

U.S. PATENT DOCUMENTS

| | | | | |
|---|---|---|---|---|
| 1,327,261 A | * | 1/1920 | Wilson | B62D 43/02 224/42.15 |
| 1,699,518 A | * | 1/1929 | Barnes | B62D 43/02 224/490 |
| 1,979,809 A | * | 11/1934 | Newton | B62D 43/02 224/42.13 |
| 2,698,118 A | * | 12/1954 | Dickason | B62D 43/02 224/42.21 |
| 6,739,269 B1 | * | 5/2004 | Benton | A47B 31/06 108/152 |
| D698,224 S | | 1/2014 | Ridges | |
| D758,829 S | | 6/2016 | Bennett | |
| D818,343 S | | 5/2018 | Ignarra | |
| 10,227,097 B2 | | 3/2019 | Smith | |
| 2010/0025443 A1 | * | 2/2010 | Racz | B62J 7/04 224/545 |
| 2012/0233813 A1 | * | 9/2012 | Settsu | E05C 17/025 16/82 |
| 2020/0148289 A1 | * | 5/2020 | Evans | B62D 43/02 |

OTHER PUBLICATIONS

Smittybilt Installation Instructions 2007-2014 Jeep JK HD Tire Carrier Kit, revised Sep. 3, 2015 (Year: 2015).*
"Smittybilt Pivot HD Tire Carrier Installation Guide", https://lib.extremeterrain.com/files/contentgenerator/smittybilt-pivot-hd-tire-carrier-0717-cust-install-J104547.html/J104547-cust.pdf, Feb. 13, 2017 (see last page for date).*
Rugged Ridge, Jeep Parts and Accessories, Bumpers, Lift Kits, Seat Covers, Soft Tops, Wheels, Winches, 8 pages, http://www.ruggedridge.com/spartacus-hd-tire-carrier-hinge-casting-18-19-jI-11546-56.html (2019).

* cited by examiner

*Primary Examiner* — Scott T McNurlen
(74) *Attorney, Agent, or Firm* — Eric Hanscom

(57) ABSTRACT

A bracket and/or hinge assembly is disclosed, for a vehicle. In various embodiments, the vehicle may be a wheeled vehicle. The hinge and/or bracket assembly may be used to assist in holding a selected spare wheel assembly for the wheeled vehicle.

17 Claims, 20 Drawing Sheets

WHEEL CARRIER BRACKET ASSEMBLY

CROSS-REFERENCE TO RELATED APPLICATIONS

This application claims benefit to U.S. Provisional Application No. 62/822,941, filed on Mar. 24, 2019, entitled Wheel Carrier Bracket Assembly. The entire disclosure of the above application is incorporated herein by reference.

FIELD

The subject application relates to a hinge assembly, and particularly to a hinge assembly that may incorporate a wheel carrier.

BACKGROUND

This section provides background information related to the present disclosure which is not necessarily prior art.

A vehicle may include a wheeled vehicle. The wheeled vehicle may be powered by an engine, such as an internal combustion engine. The engine may drive the wheels through a transmission system that may be operated by a user.

Generally, the wheels may be formed of a material that is substantially rugged. During various uses, a portion of the wheel, such as a rubber covering, may become damaged and/or a wheel rim may be damaged. After damaging of the wheel, or a portion thereof, a replacement or spare wheel may be used to replace the broken or damaged wheel. The spare wheel may be carried by the vehicle.

SUMMARY

This section provides a general summary of the disclosure, and is not a comprehensive disclosure of its full scope or all of its features.

Various vehicles, such as wheeled vehicles, may carry a spare wheel. The wheel may include a rim that is surrounded by a traction enhancing material, such as a rubber or rubber compound tire. In various embodiments, the spare wheel may be carried externally to the vehicle, such as in or on a mount connected to a body on a panel of the vehicle.

For example, a spare wheel may be carried on a tailgate, door, or other appropriate rear portion of a vehicle. The tailgate may be connected to various other portions, such as a frame or outer body portions, of the vehicle with a hinge assembly. The hinge assembly may be provided with a selected configuration and a construct to carry the spare wheel of a selected mass. The hinge assembly allows the tailgate to be moved relative to a body of the vehicle. The spare wheel (which may include a rim and a tire) may have a mass or weight of about 40 pounds to about 100 pounds (about 18 kilograms to about 45 kilograms), including a mass or weight of greater than about 50 pounds (22 kilograms).

In various embodiments, a hinge assembly may connect the tailgate to additional portions of the vehicle, such as a frame or side panel, and also include or be connected to a wheel carrier. Accordingly, the mass of the tailgate and/or the spare wheel may be carried by the hinge assembly. The hinge assembly, therefore, may include a strength and toughness to carry the mass of the spare wheel and the tailgate assembly. Additionally, various components may be used to provide additional rigidity and strength to the assembly, including to the vehicle body itself.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 8:
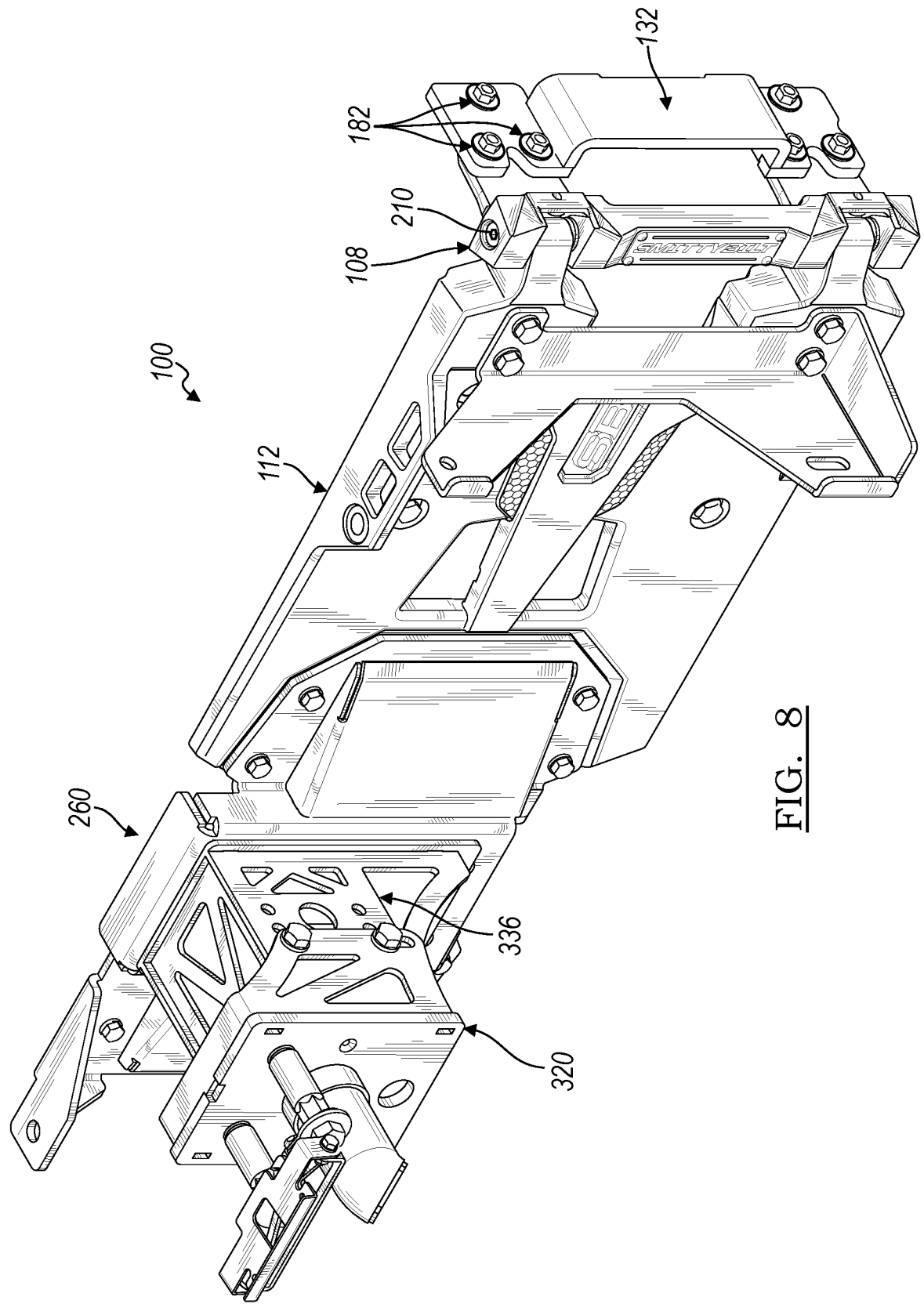
FIG. 8 is a top rear perspective view from the first side of wheel carrier bracket assembly.
Figure 9:
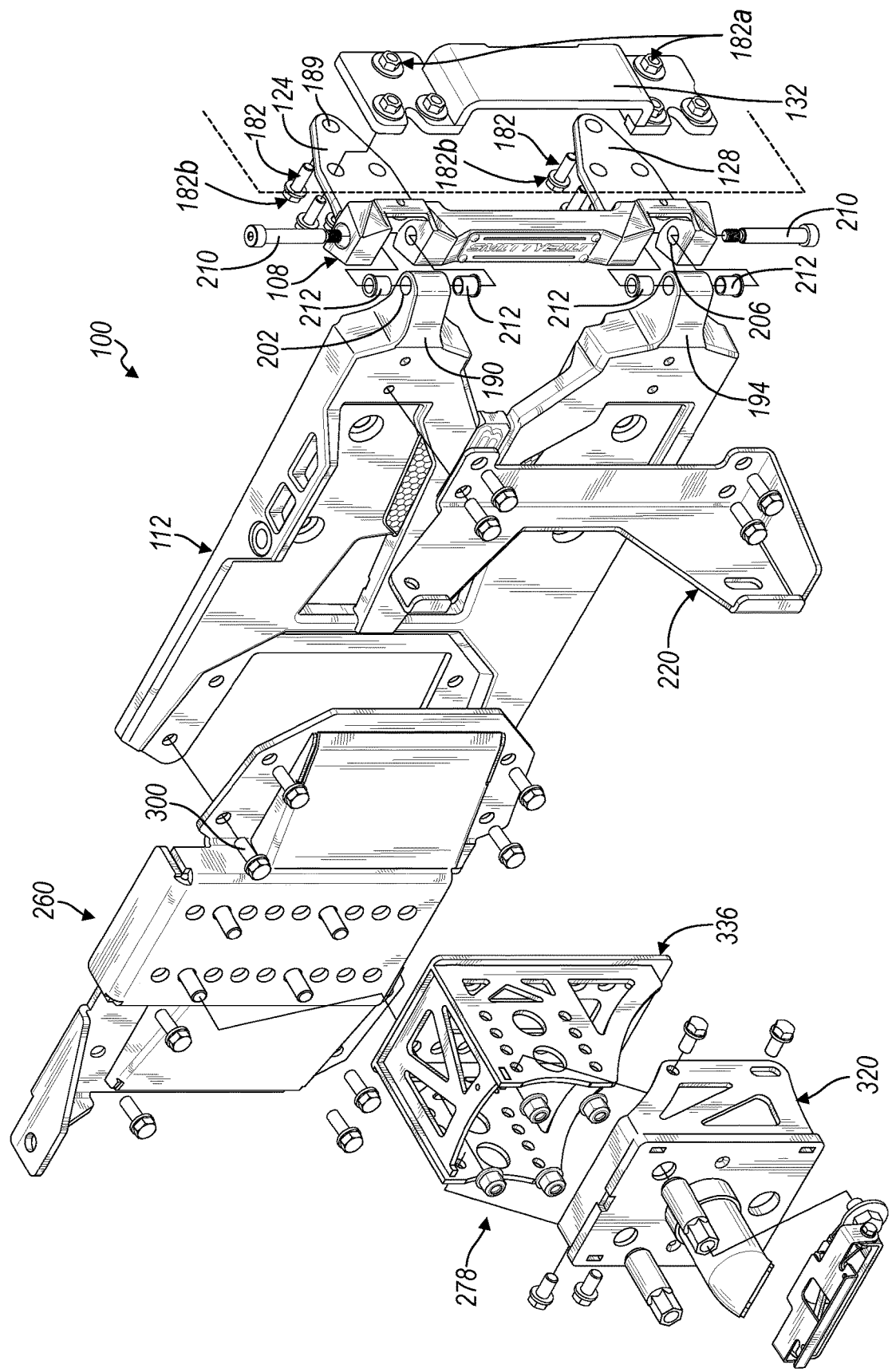
FIG. 9 is an exploded view of FIG. 8.
Figure 10:
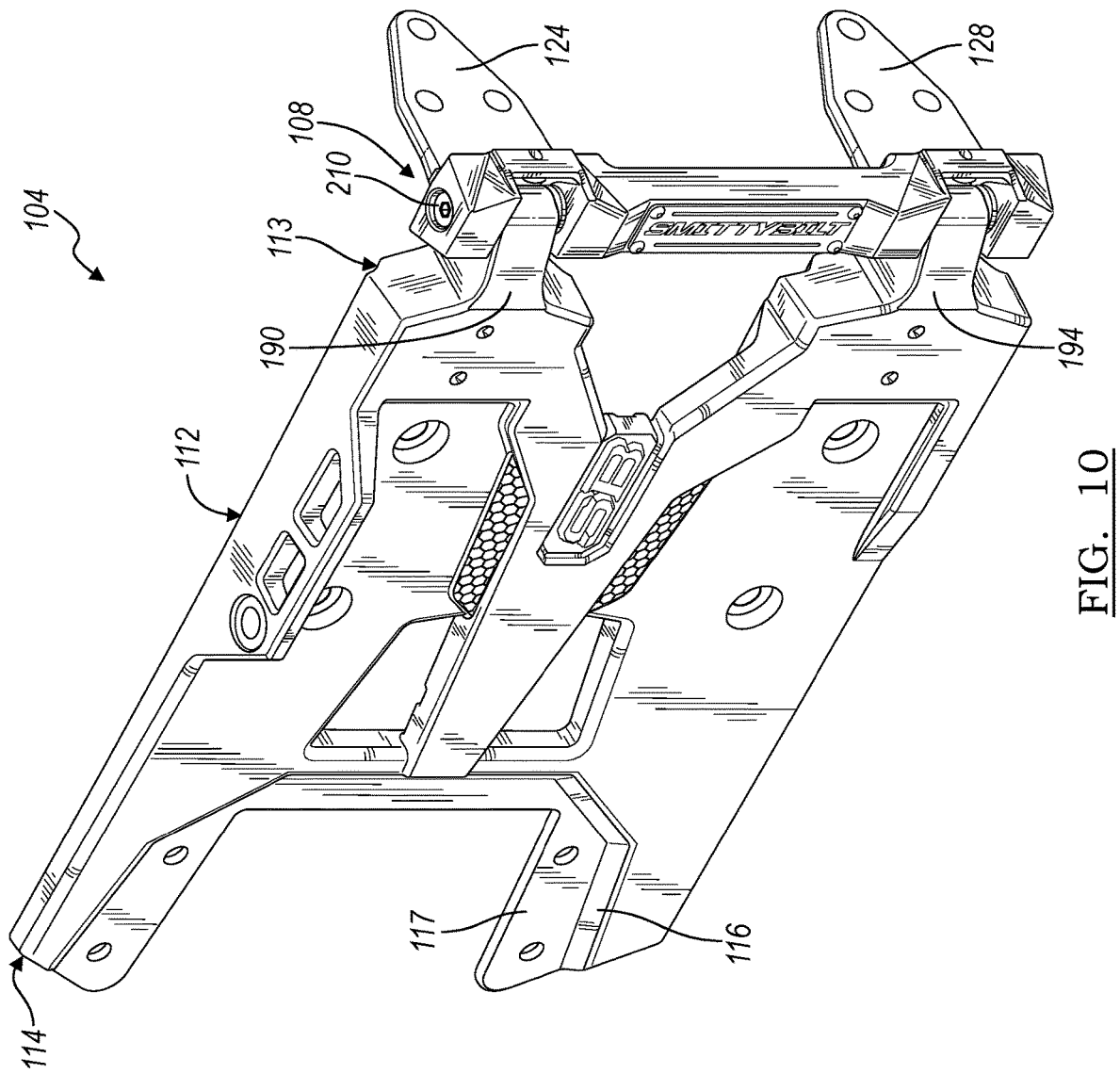
FIG. 10 is a detail front perspective view of a hinge portion of the wheel carrier bracket assembly.
Figure 11:
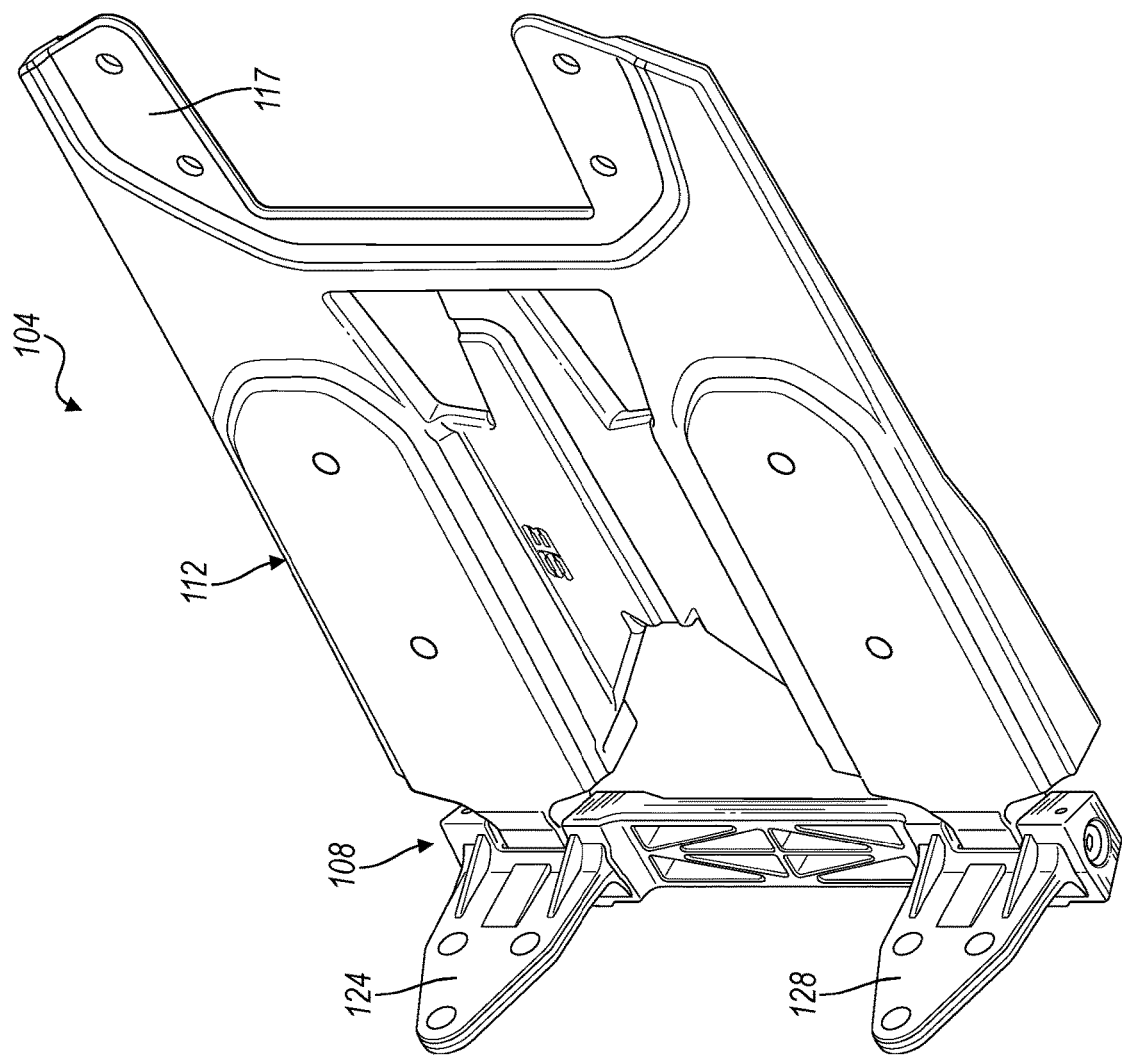
FIG. 11 is a detail rear perspective view of a hinge portion of the wheel carrier bracket assembly.
Figure 18:
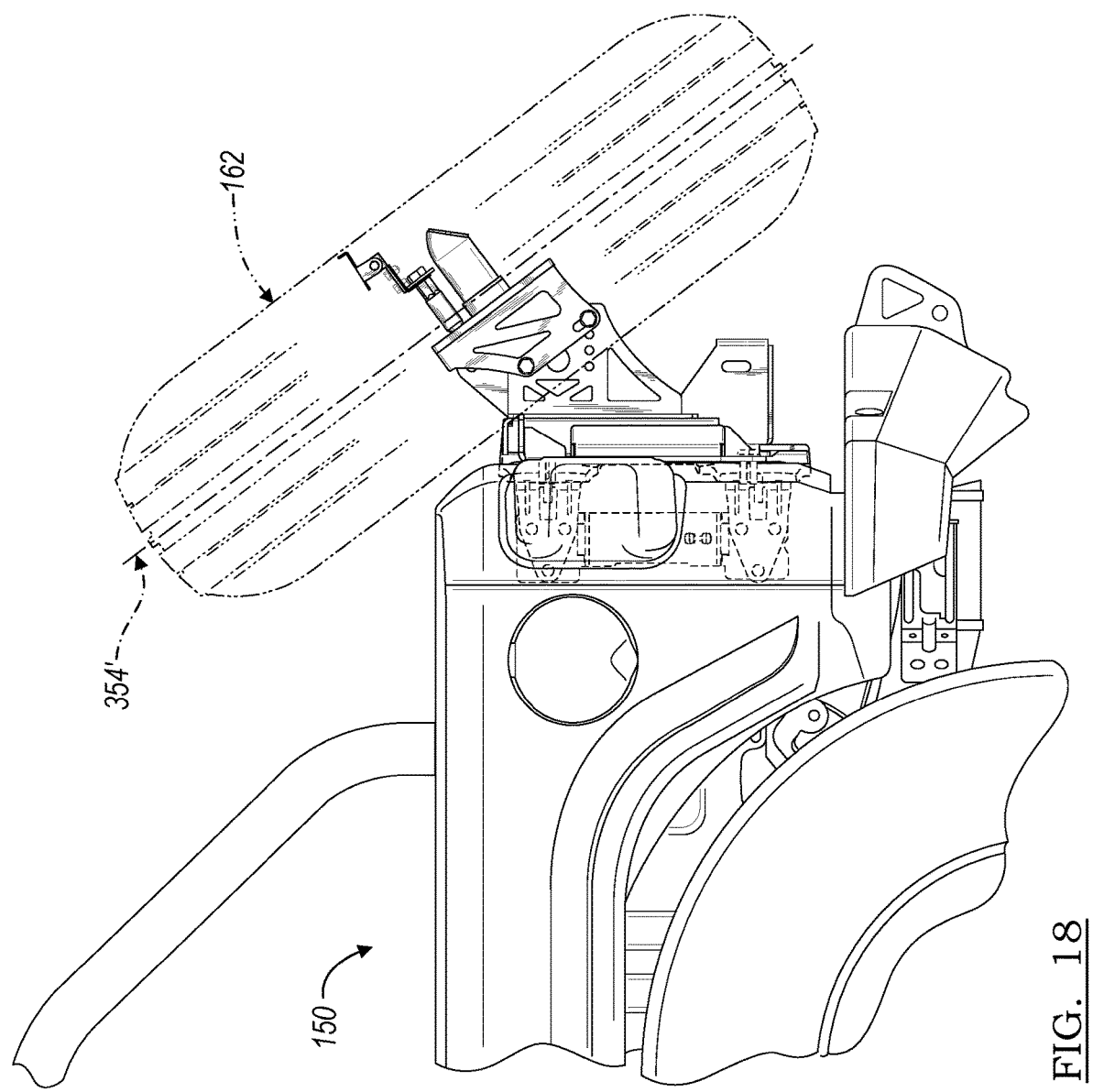
FIG. 18 is a detailed environmental view of an angled position of a wheel relative to a mounted bracket assembly.
Figure 20:
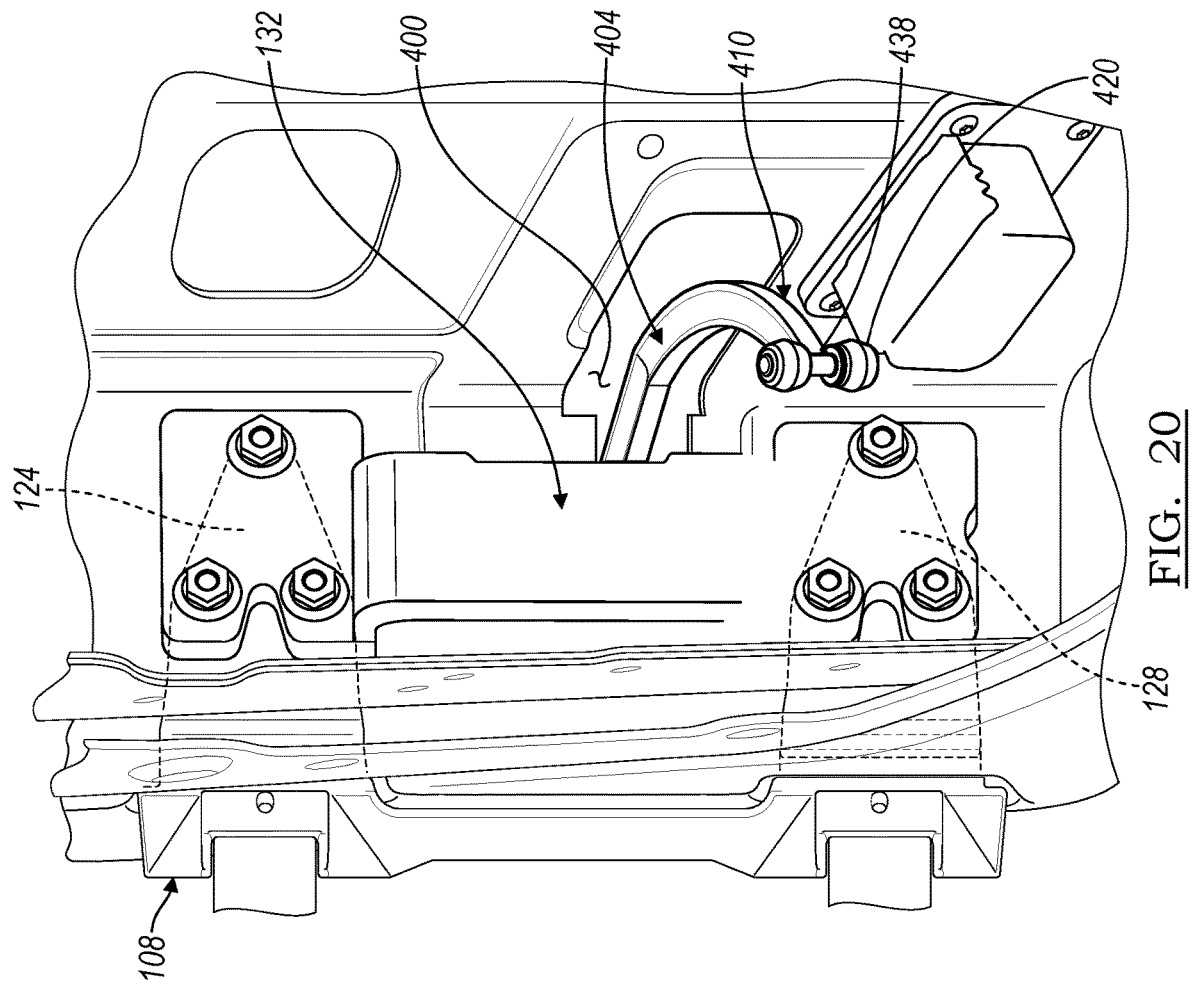
FIG. 20 is a detailed exterior view of a door travel arm and stop portion.
Figure 19:
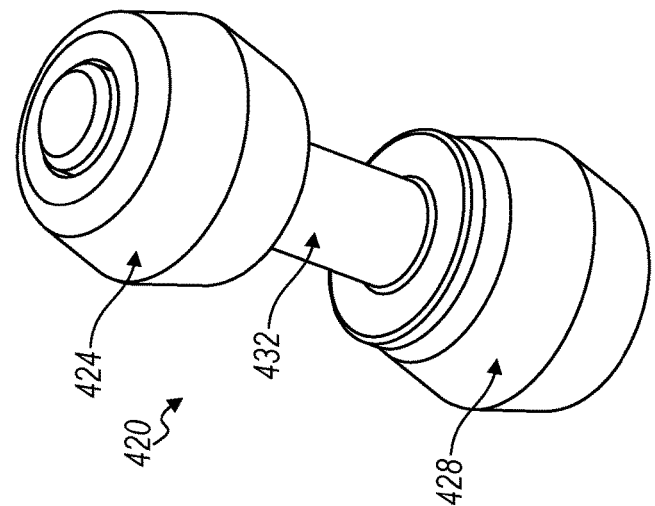
FIG. 19 is a perspective view of a stop member.
Figure 21:
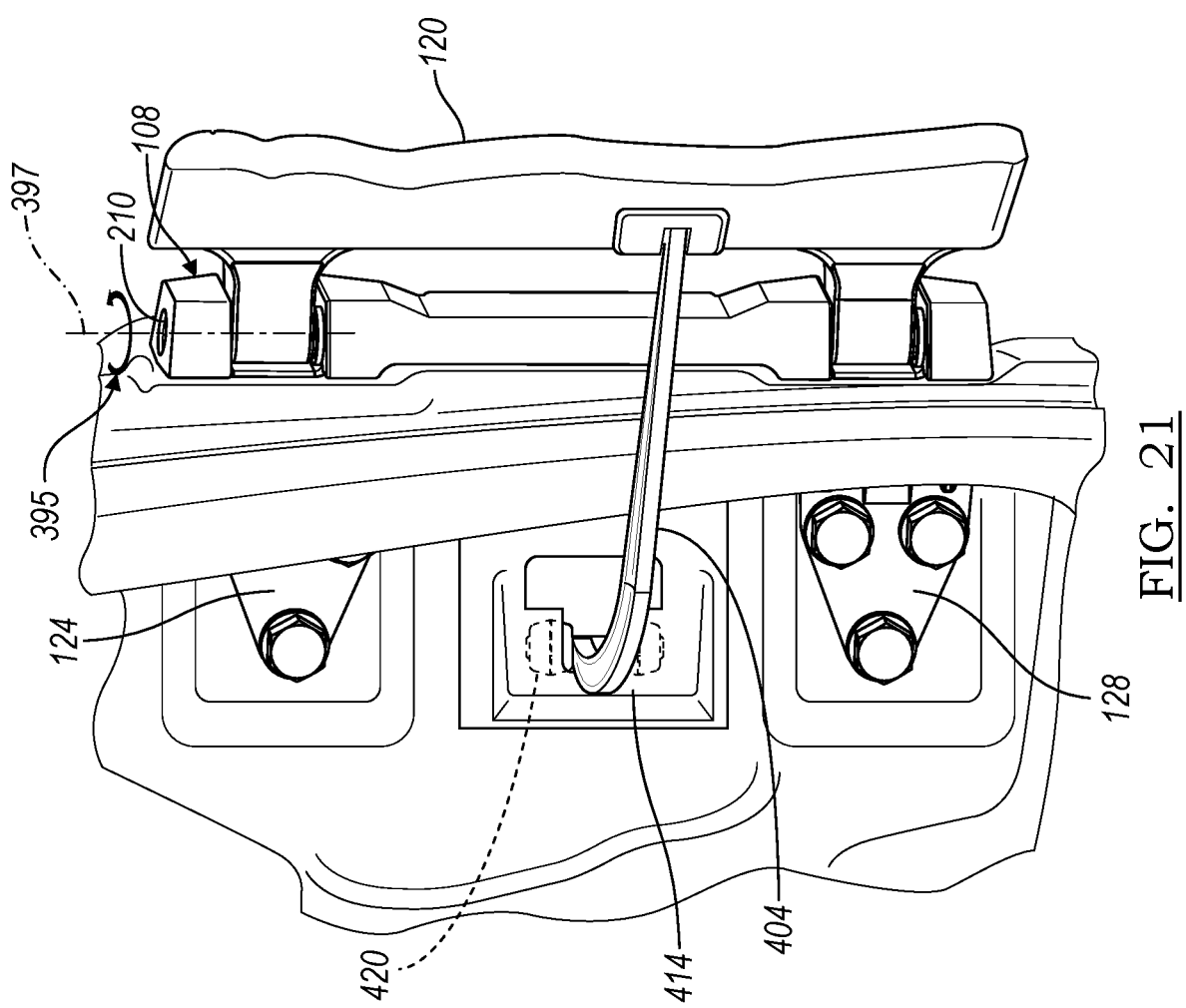
FIG. 21 is a detailed interior view of a door travel arm and stop portion.

With reference to the Figures an assembly and various environmental views are illustrated. In FIG. 1 through FIG. 9, a hinge and wheel carrier assembly 100 is illustrated that includes various portions, as discussed herein. FIGS. 10 and 11 illustrate a bracket 112 and a hinge member or portion 108 of a hinge assembly portion 104 of the hinge and wheel carrier assembly 100. FIG. 12 through FIG. 18 illustrate various portions and environmental views of the hinge and wheel carrier assembly 100. FIG. 19 through FIG. 21 illustrate a door stop and/or holding member that may be associated with the hinge and wheel carrier assembly 100.

Figure 1:
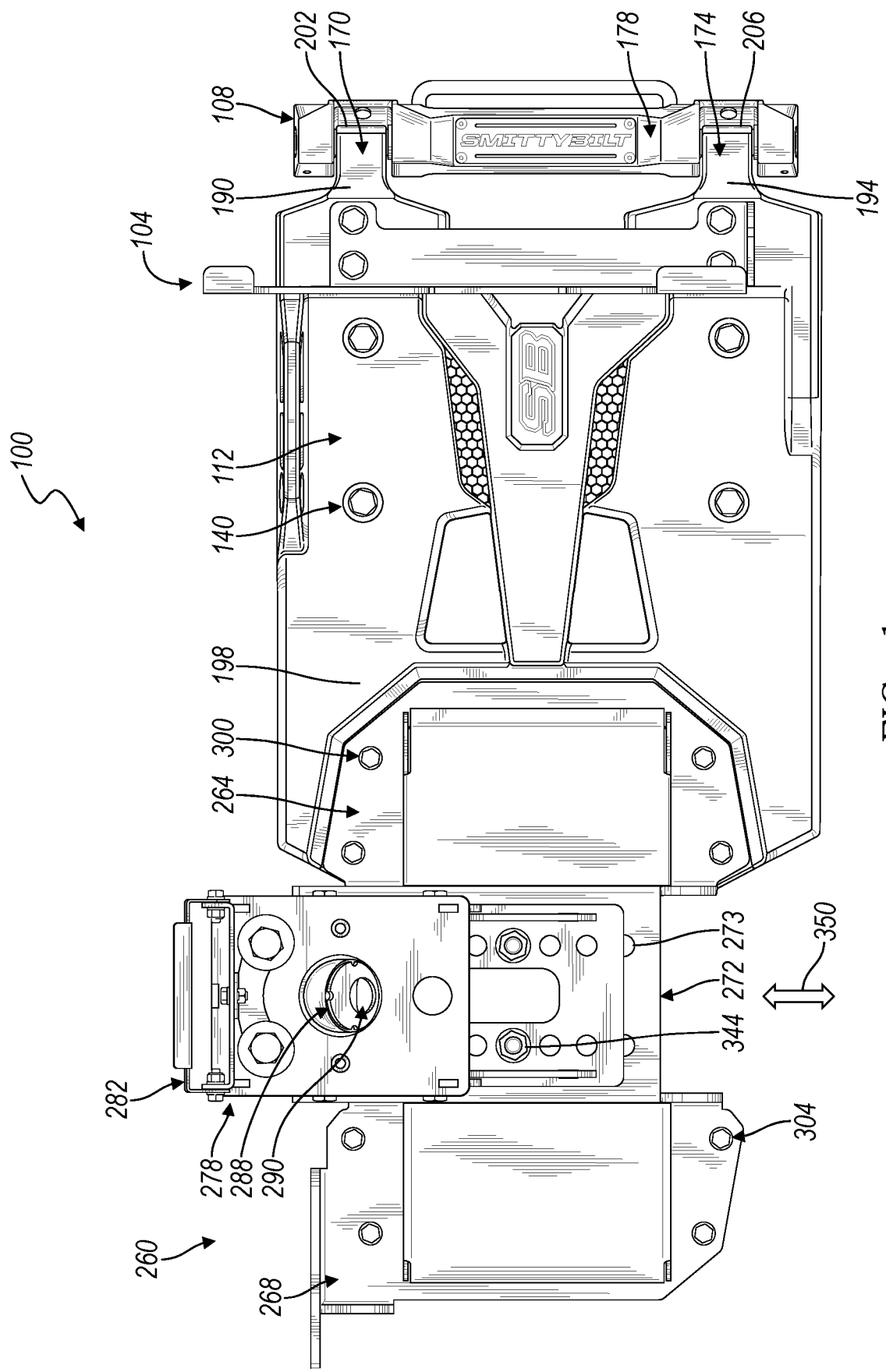
FIG. 1 is a front elevation view of a wheel carrier bracket assembly.
Figure 2:
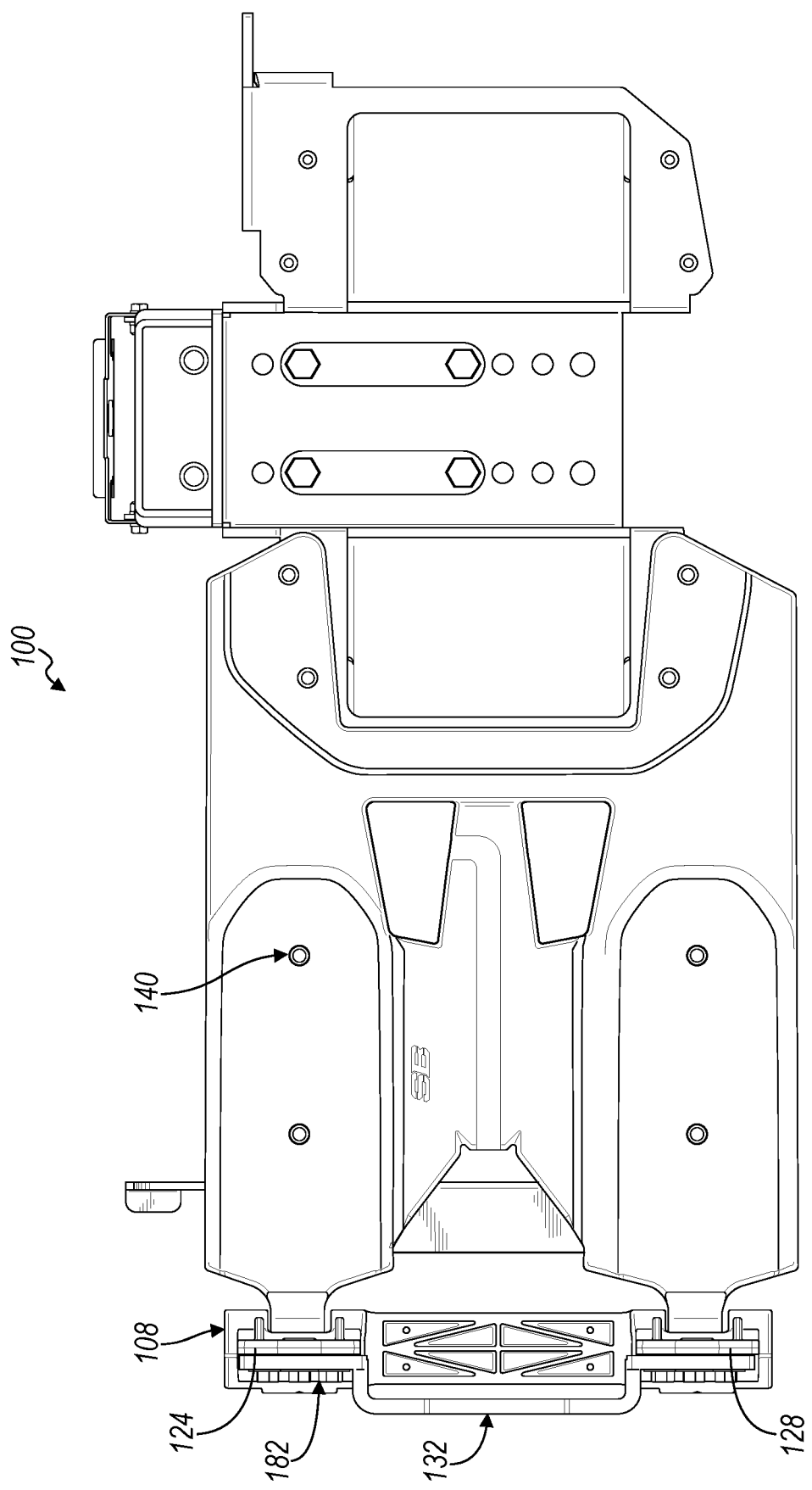
FIG. 2 is a rear elevation view of the wheel carrier bracket assembly.

The wheel carrier and hinge assembly 100 may include various components such as the hinge assembly portion 104 including the hinge portion (also referred as a side body or frame connecting member) 108 and the bracket (also referred to as a tailgate or rear wheel panel connection portion) 112. With continuing reference to FIG. 1 and additional reference to FIG. 12, the hinge assembly 104 includes the main bracket 112 that connects to a rear body panel or tailgate 120. The side panel or frame connection portion 108 of the hinge assembly 104 may include a first or top connector 124 and a second or bottom connector 128. The hinge assembly 100 can further include a panel or connection reinforcement member 132, as illustrated in FIG. 2, which extends between the top connector 124 and the bottom connector 128. It is understood that reference to top and bottom is merely for the clarity of the current disclosure, and not intended to limit the scope thereof.

Figure 3:
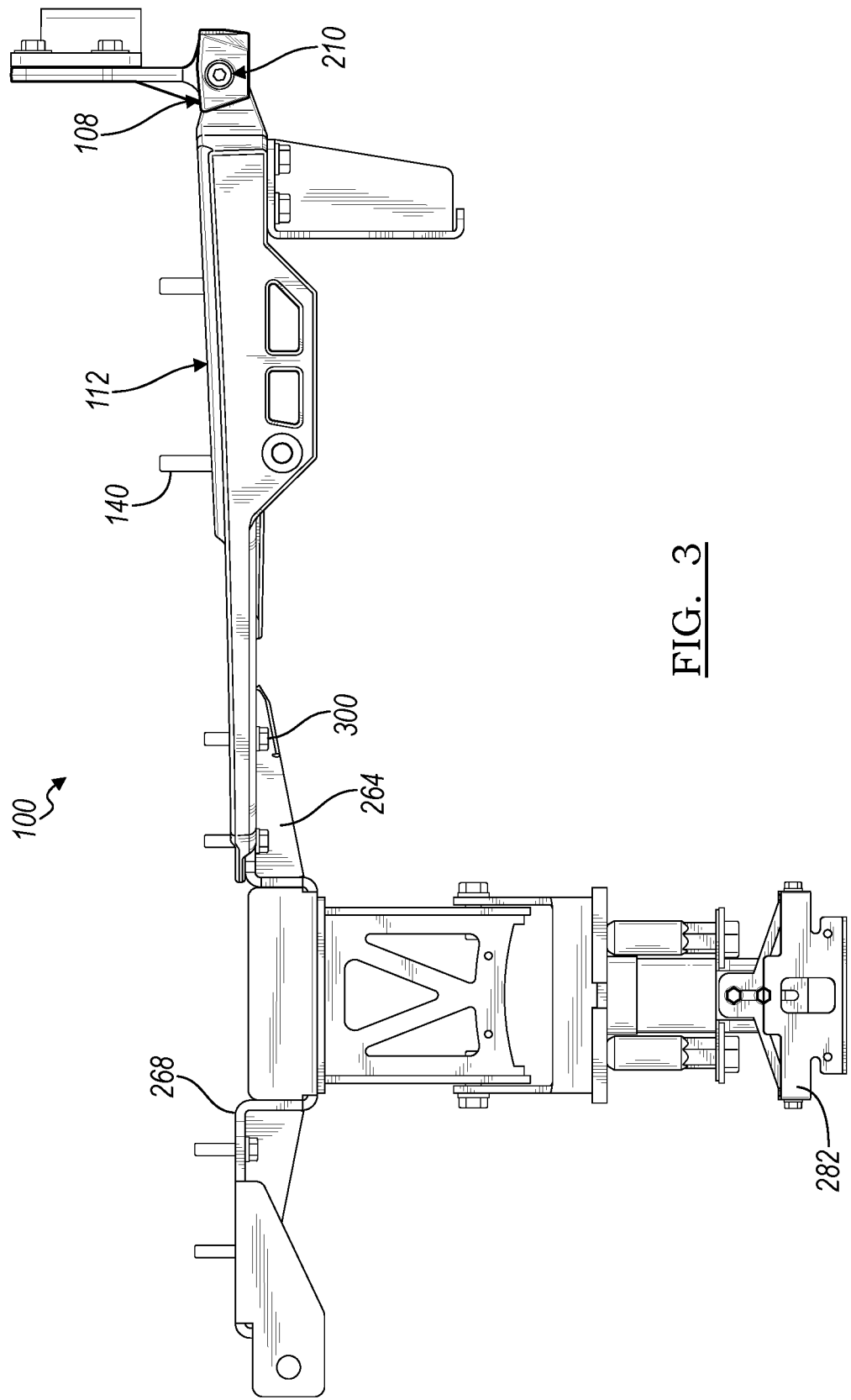
FIG. 3 is a top plan view of the wheel carrier bracket assembly.
Figure 4:
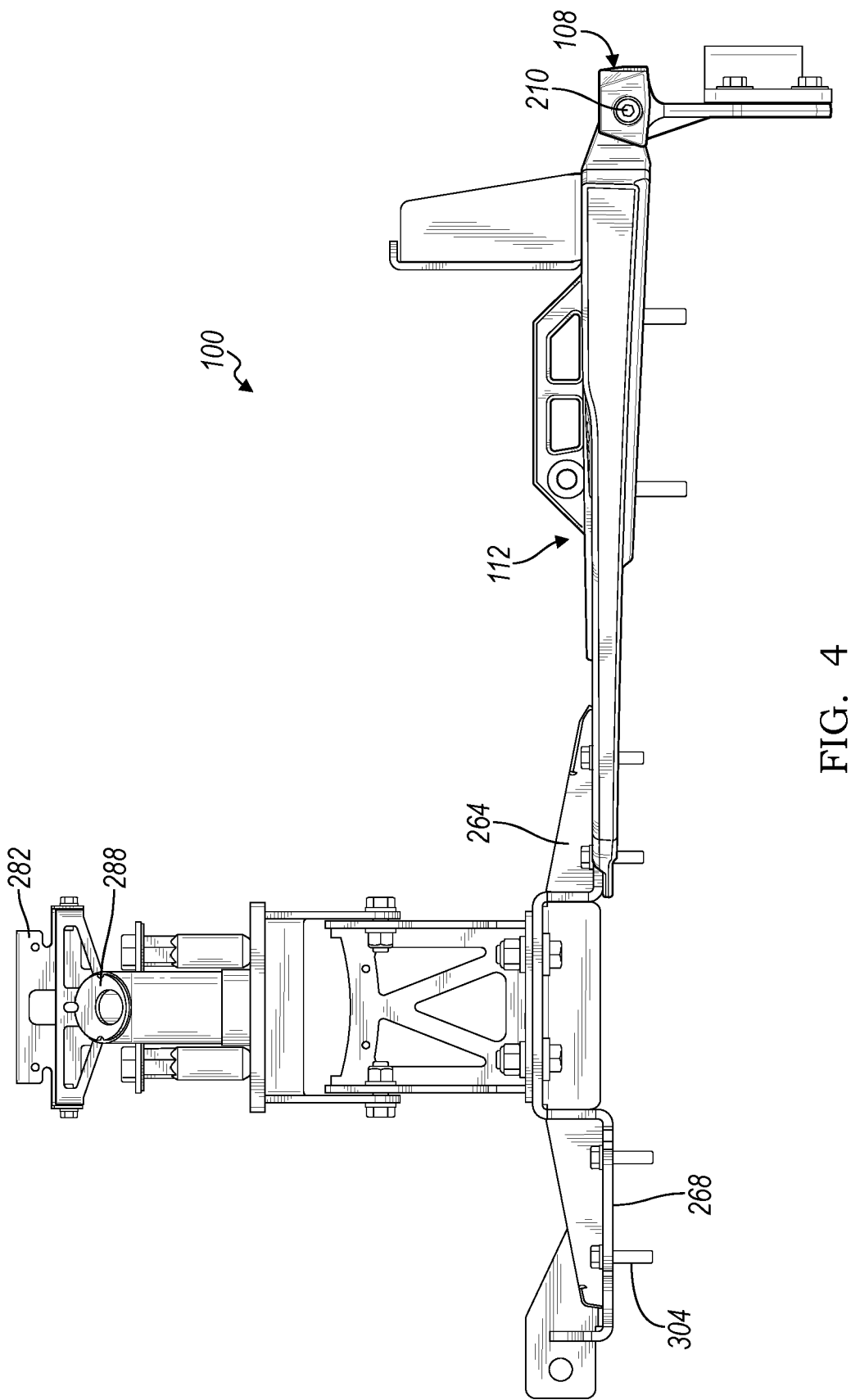
FIG. 4 is a bottom plan view wheel carrier bracket assembly.
Figure 12:
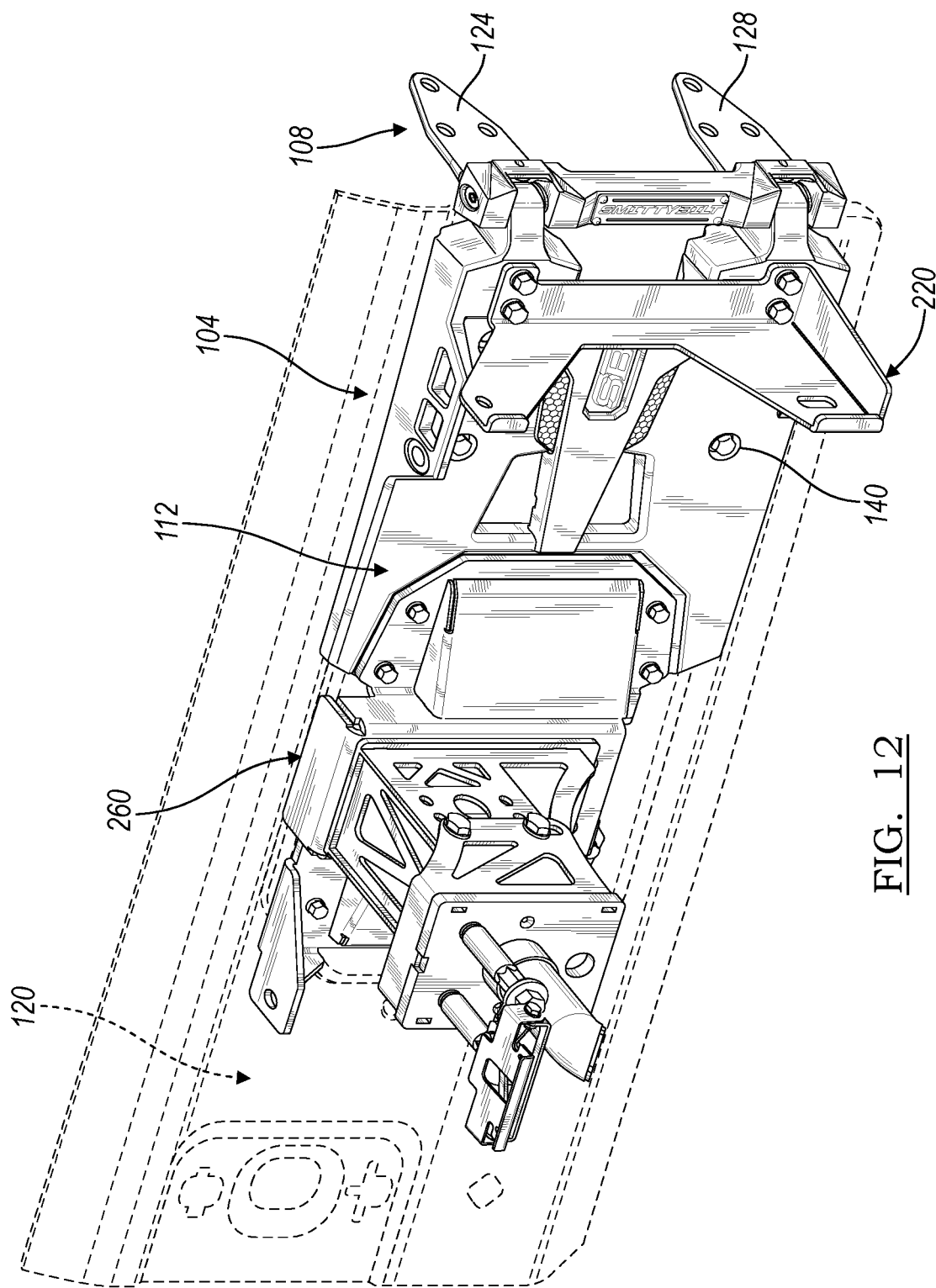
FIG. 12 is a detailed environmental view of a bracket and hinge assembly connected to a tailgate.

With continuing reference to FIG. 2 and FIG. 12 and additional reference to FIG. 3, the bracket 112 may be fixed to the tailgate 120 in an appropriate manner. For example, one or more fasteners 140, such as bolts, screws, rivets, or the like may extend through the bracket member 112 and into the tailgate assembly 120. It is understood that any appropriate number of the fasteners 140 may be used to fix the main bracket 112 to the tailgate 120, and the illustration of the number in FIG. 2 and in various figures, is merely exemplary.

The main bracket member 112 may be fixed to the tailgate 120 in an appropriate manner to fix the bracket assembly 100 to the tailgate 120. The main bracket 112 may be provided to carry the mass of the spare wheel 162 (FIG. 13) relative to the tailgate 120. Thus, the main bracket 112 may be formed of a selected material, such as aluminum, titanium, or metal allow to carry the mass of the spare wheel 162. The fasteners 140 may be provided in an appropriate much to ensure that the main bracket and the spare wheel 162 are appropriately fixed to the tailgate 120 and to be held relative to the hinge portion 108.

With continuing reference to FIGS. 1-9, and additional reference to FIGS. 10 and 11, the main bracket 112 may include various portions to assist in mounting and reinforcing the assembly 100 relative to the tailgate 120 and/or for reinforcing the tailgate 120. As discussed above, the spare wheel 162 may include a mass to be carried substantially by the main bracket 112 relative to the hinge portion 108 that are mounted to the vehicle body, as discussed further herein. Accordingly, the main bracket 112 may extend from a hinge connection 113 to a wheel carrier portion or section 114. The main bracket 112, therefore, may include a body portion 198 that may include various structures or portions. The main bracket body 198 may include various bore holes to allow the fasteners 140 to pass there through and connect to the tailgate 120 and/or other stability portions, such as projections or fingers to engage the tailgate 120. Further, the main body 198 may include a depression or lowered area or region wall 116 that may extend from the upper or top surface of the body 198 to a plate or panel 117 that engages or holds the wheel carrier assembly 260, as discussed further herein.

Figure 13:
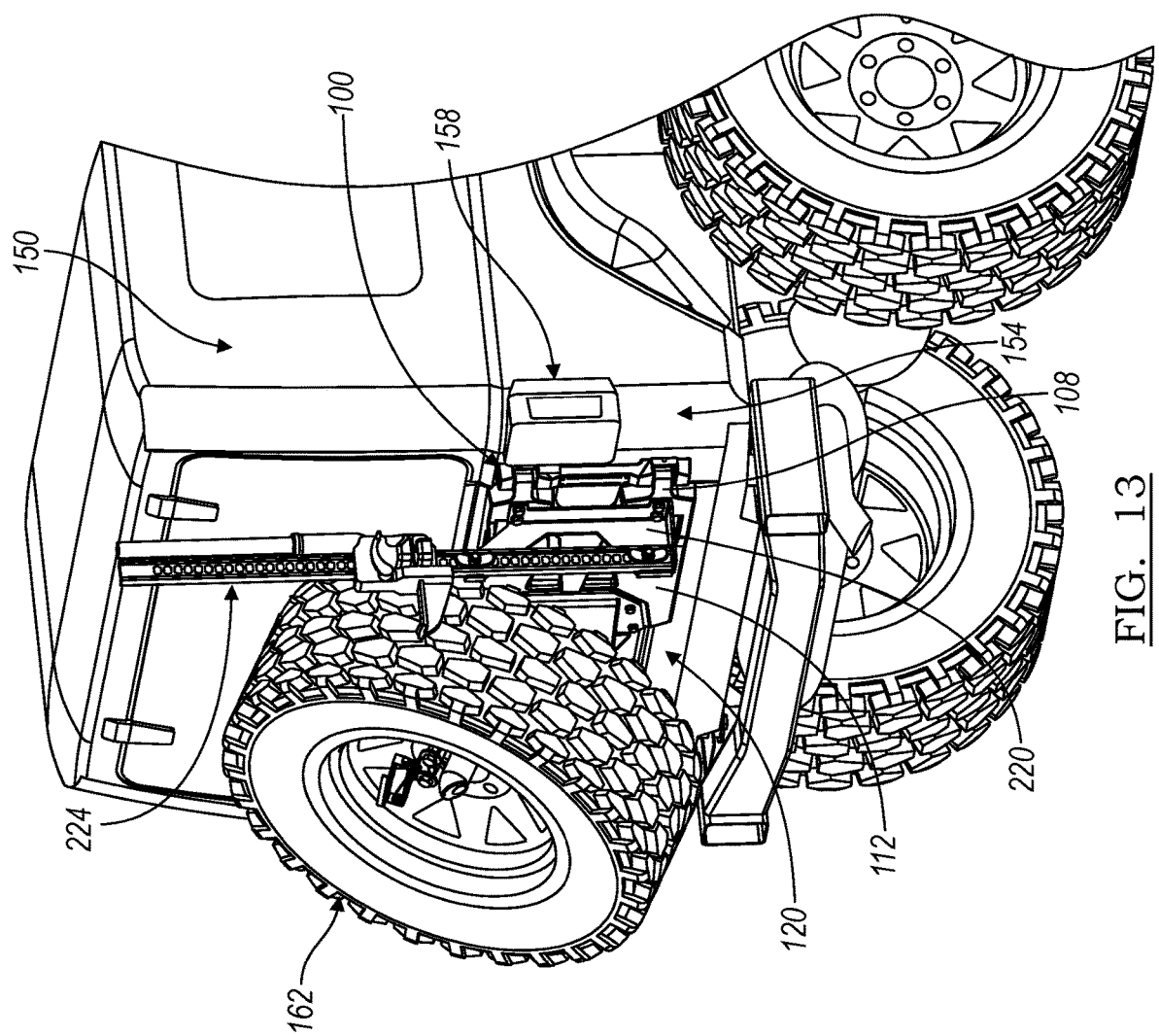
FIG. 13 is an environmental view of a wheel carrier and bracket and hinge assembly connected to a vehicle.

As illustrated in FIG. 12, the tailgate 120 may be substantially held with the hinge assembly 100 relative to the vehicle, as also illustrated in FIG. 13. As illustrated in FIG. 13 the hinge assembly 100 is fixed to a vehicle 150 having the tailgate 120 that is movable relative to one or more side panels including a side panel or rear fender portion 154. The side panel 154 may include a light fixture, such as a rear light fixture 158 that may be fixed to the side panel 154 and/or removable therefrom (FIG. 14), as discussed further herein. As further illustrated in FIG. 13, the wheel assembly (also referred to as the spare wheel) 162 may be connected to the hinge and wheel carrier bracket assembly 100. The wheel carrier and bracket assembly 100 may include the main bracket portion 112 that may be connected to the tailgate 120 and the hinge portion (also referred to as a side panel connection portion) 108 connected to the side panel and/or relative to the side panel 154. The hinge and wheel carrier bracket assembly 100 may, therefore, allow the tailgate 120 to swing or open (i.e. hingedly) move relative to the side panel 154 when assembled, as discussed herein.

With continuing reference to FIG. 1, the hinge and wheel carrier bracket assembly 100, therefore, may define one or more hinge portions or regions, such as a first hinge portion 170 and a second hinge portion 174. The two hinge portions 170, 174 may be formed between the hinge portion 108 and the main bracket member 112. Generally, the hinge portions 170, 174 may include portions that extend or are formed at the bracket end 113. Moreover the hinge portion 108 may extend between the two connector portions 124, 128 with a connection portion or a member 178.

The connection member 178 may be formed integrally, for example as a single piece, with the connector portions 124, 128. It is understood, however, that the connection member 178 may also be formed separately from the connection members 124, 128 and fixed thereto such as with fasteners or connection mechanisms or processes (e.g. welding, brazing, etc.). Accordingly the hinge portion 108 may be formed as a single piece and fixed to the vehicle side panel 154 with appropriate connection portions, such as one or more fasteners 182, as illustrated in FIG. 8, FIG. 9, and FIG. 10. The fasteners 182 may be any appropriate type of fasteners, such as bolts, nuts, or the like that may be used to fix the hinge portion 108 to the vehicle side panel 154, or a selected portion thereof. In various embodiments, the fasteners 182 may include a nut 182a and a bolt 182b. The bolt 182b may pass or extend through the bores 189 and through a bore in the reinforcement portion 132 and engage the nut 182a. A threaded engagement may be used to engage the nut 182a and the bolt 182b. It is understood, however, that other appropriate engagements maybe used.

The fasteners 182 pass through one or more projections or fingers of the hinge portion 108. For example, as illustrated in FIG. 8 and FIG. 9, the hinge portion 108 includes the top projection 124 at a first end of the hinge portion 108 and the bottom projection 128 at a second end of the hinge portion 108. Each of the first and second projections 124, 128 define bores 189 through which the fasteners 182 pass. The fasteners 182 may then engage the panel 154 and/or the reinforcement 132 to fix the hinge portion 108 relative thereto.

In addition to the hinge portion 108, the reinforcement member 132 may also be used to assist in reinforcing or connecting the bracket assembly 100 to the vehicle 150. The reinforcement member 132, as illustrated in FIGS. 2, 8, and 10, may extend between the connection portions 124, 128. The reinforcement member 132 may be an integrally formed or provided member, such as formed as one piece or formed as a plurality of pieces that are fixed together. For example, the reinforcement member 132 may be formed as a plurality of members and fixed together with selected fasteners and/or fixation processes (e.g. welding, brazing, etc.). The reinforcement member 132, as discussed herein, may be provided to reinforce or support connection areas or bores for the hinge portion 108.

Figure 14:
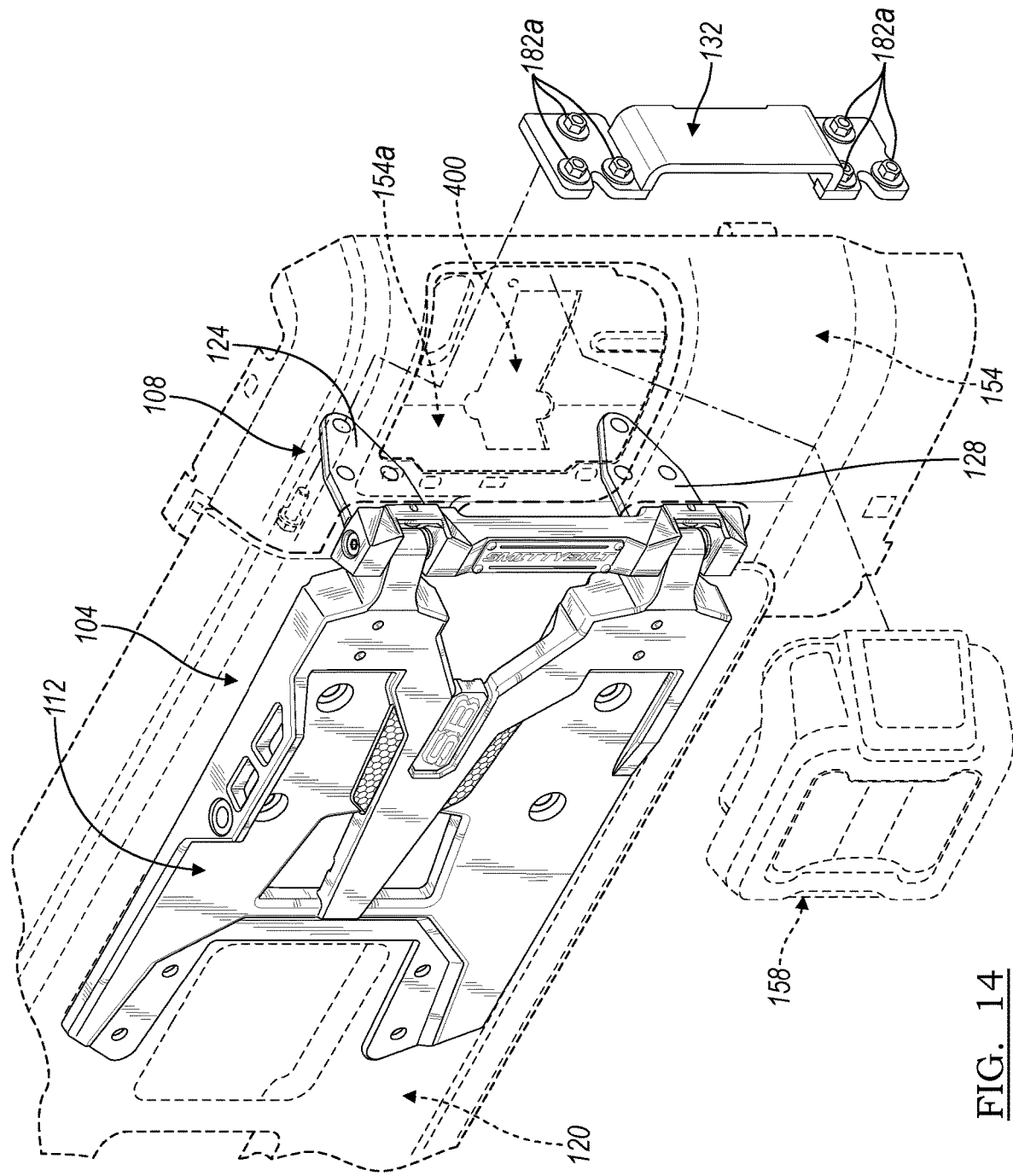
FIG. 14 is a partial exploded detail view of a tail lamp and reinforcement member.

During an install of the hinge and bracket assembly 100, such as during an original manufacturing or as an aftermarket install, the reinforcement member 132 may be connected or positioned near or adjacent the side panel 154. In various embodiments, for example, the side panel 154 may include a selected fabrication or design, as illustrated in FIG. 14, having a portion of material, such as sheet metal, or the like, forming a portion of the side panel 154a. In various embodiments, as illustrated in FIG. 14, the rear tail light or tail light assembly 158, may be removed from the rear side panel 154. The reinforcement member 132 may then be positioned through an opening, such as on left by the taillight removal, to side panel 154 of the vehicle 150 to engage a first side of the side panel portion 154a.

The extension or connection portions 124, 128 may extend along a second side of the side panel portion 154a, such as opposite the side panel 154a. The connectors 182 may then pass through the reinforcement member 132, the side panel portion 154a, and the connection portions 124, 128 to fix the hinge portion 108 to the side panel 154. The main bracket 112 may be fixed to the tailgate 120 with the connection members 140, as discussed above. As discussed herein, the bracket 112 may be hingedly connected to the hinge portion 108 to allow the bracket 112 (and the connected tailgate 120) to hingedly move relative to the hinge member 108 (and the side panel 154). Thus, the reinforcement member 132 may be used to reinforce the connection of the wheel carrier and hinge assembly 100 to the vehicle 150, such as to the side panel 154.

In various embodiments, the reinforcement member 132 may be formed of a selected material including steel or steel alloys (e.g. stainless steel alloys), titanium, or other appropriate metal portions. The reinforcement member 132 may also be formed by forging, welding, or the like. The hinge portion 108 may also be formed of selected materials, such as steel, steel alloys, aluminum or aluminum alloys, or other appropriate metals or materials. The hinge portion 108 may be formed by various selected techniques, such as forging, machining, or casting of selected materials as discussed above. The main bracket 112 may also be formed of selected processes such as casting, machining, or forging of selected materials such as aluminum, steel, titanium, or other appropriate materials. Nevertheless, the main bracket 112 and the hinge portion 108 may form the hinge portions or hinge areas 170, 174.

The two hinge portions 170, 174, therefore, may allow or form a hinged connection between the main bracket 112 and the hinge member 108. The main bracket 112 may include a first projection or ear 190 and a second projection or ear 194 that extend from a main portion or body portion 198 of the main bracket 112. The ears 190, 194 may be received in gaps or openings, including a first opening 202 and a second opening or passage 206 in the hinge portion 108. The openings 202, 206 may receive or allow the ears 190, 194 to be received therein to allow for movement of the main body 198 relative to the side panel 154. Passages or connection portions may be formed in the hinge portion 108 to receive one or more hinge pins 210. It is understood that an appropriate hinge pin or assembly may be used to interconnect the hinge portion 108 and the main bracket 112. For example, one or more bushings or bearing members 212 may surround the hinge pin 210 to assist in smooth and efficient movement of the tailgate 120, to which the main bracket 112, is connected, relative to the hinge portion 108.

In various embodiments, one extended hinge pin 210 may extend between both hinge portions 170, 174 or each hinge portion 170, 174 may have a separate hinge pin 210 spanning the opening 202, 206 and engaging the ears 190, 194.

The main bracket 112 may also carry or hold various auxiliary or additional portions or assemblies. The additional portions may be releasably connected to the main bracket in a selected manner. The additional portions may assist or hold other appropriate members relative to the vehicle 150. For example, a jack bracket or jack holding member 220 may be fixed to the main bracket 112. The jack bracket 220 may hold a jack 224 relative to the vehicle and the hinge and bracket assembly 100, as illustrated in FIG. 13. The jack 224 may be used for various purposes, as is understood by one skilled in the art. The jack 224 may also be mounted directly to the bracket 112 in an appropriate manner prior to a selected use. Other portions may also be connected, such as fuel containers, water containers, etc.

With continuing reference to FIGS. 1-8 and addition reference to FIGS. 13-18, the hinge and bracket assembly 100 may further include a wheel holder or carrier assembly 260. The wheel carrier assembly 260 may include various portions, such as a first bracket connection side or portion 264 and a second tailgate connection portion 268. The two portions 264, 268 may be interconnected with a connection or bracket portion 272 that has or defines one or more connection portions, such as one or more throughbores 273.

The wheel carrier bracket 260 may be formed as a single piece and/or connected or formed together of a plurality of pieces such as by welding, or the like. Nevertheless, the bracket connection portion 264 may be integrally formed into a single piece or formed as a single piece with the bracket portion 272 in the tailgate connection portion 268. In various embodiments, the tailgate connection portion 268 is a single piece configured to be connected to the tailgate 120 and the bracket connection portion 264 is a single piece connected to the main bracket 112 and the bracket portion 272 is fixed between the two pieces during installation. In various embodiments, all of the tailgate connection portion 268, the bracket connection portion 264, and the bracket portion 272 is one piece that is mounted to the main bracket 112 and the tailgate 120 as a single unit during installation.

Extending from the bracket connection portion 264 may be a wheel mounting bracket assembly 278. The wheel mounting bracket assembly 278 may be movable relative to the central bracket portion 272, as discussed further herein. Also the wheel mounting bracket 278 may include a light or accessory mounting portion 282 that may be movable relative to the central bracket portion 272 separate or independent of the wheel mounting portion 278. Additionally, an auxiliary or camera portion 288 may extend from the wheel mounting bracket portion 278. In various embodiments, a camera lens or portion may be mounted through an opening 290 formed in the bracket portion 288 for various accessories such as a backup or rear view camera.

In various embodiments the wheel mounting bracket portion 260 may be mounted independent of or affixed to the main bracket portion 112. Various fasteners or connectors 300, such as bolts, nuts, or screws may connect the wheel mounting portion 260 to the bracket 112 and additional or similar fasteners 304 may be used to fix the bracket portion 260 to the tailgate 120.

Figure 5:
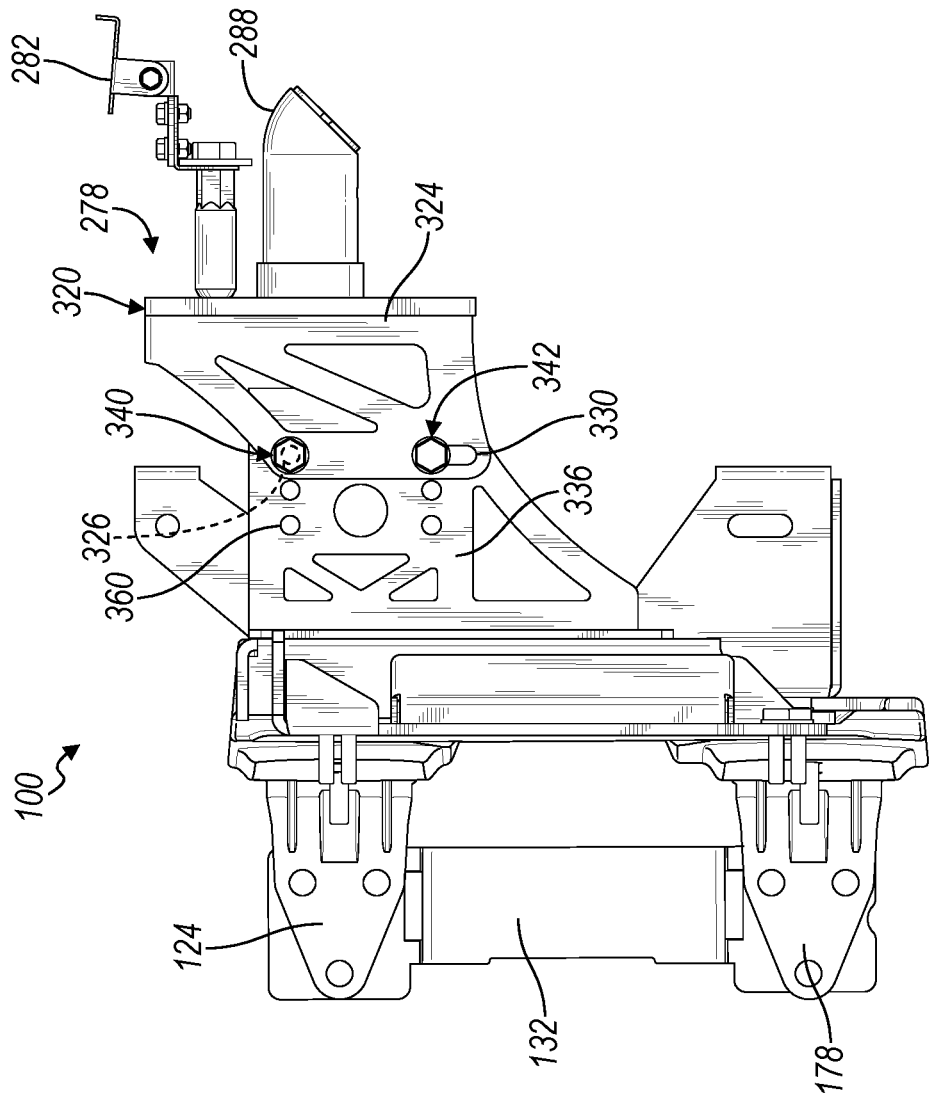
FIG. 5 is a first side elevation view of wheel carrier bracket assembly.
Figure 6:
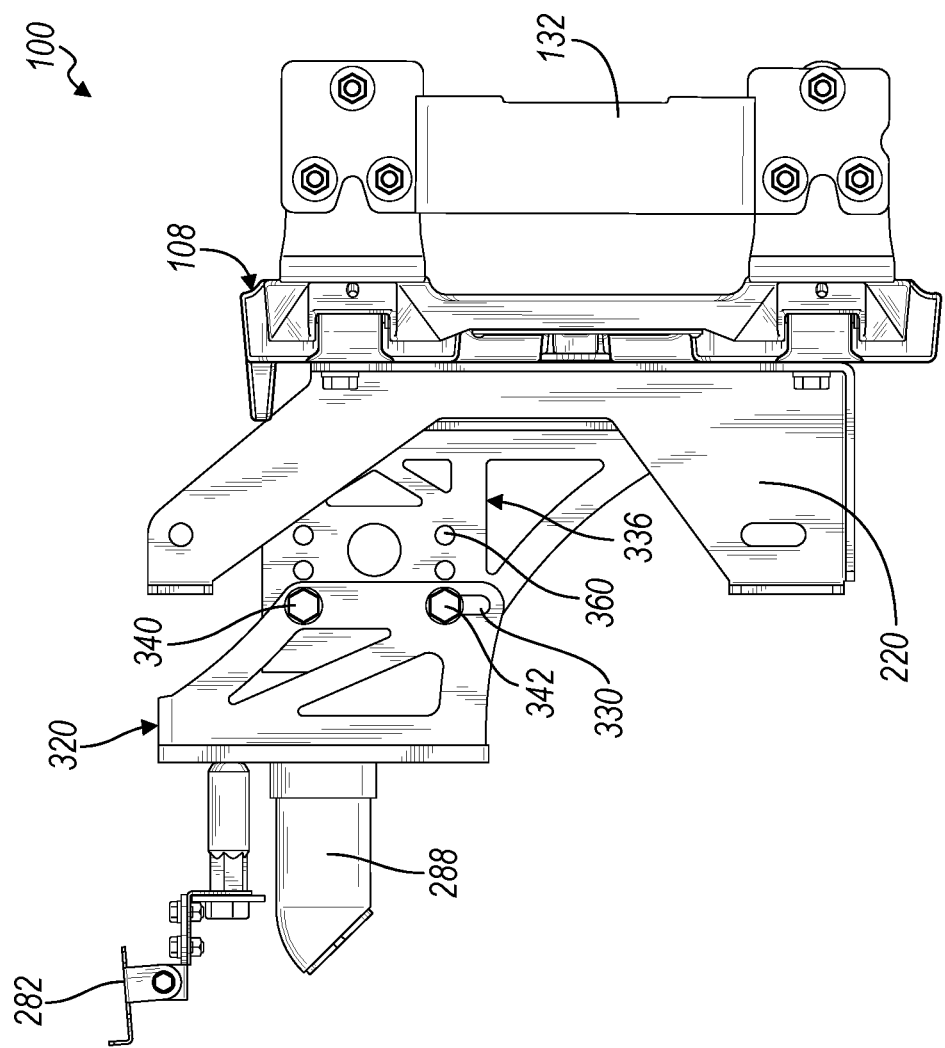
FIG. 6 is a second side elevation view of wheel carrier bracket assembly.
Figure 7:
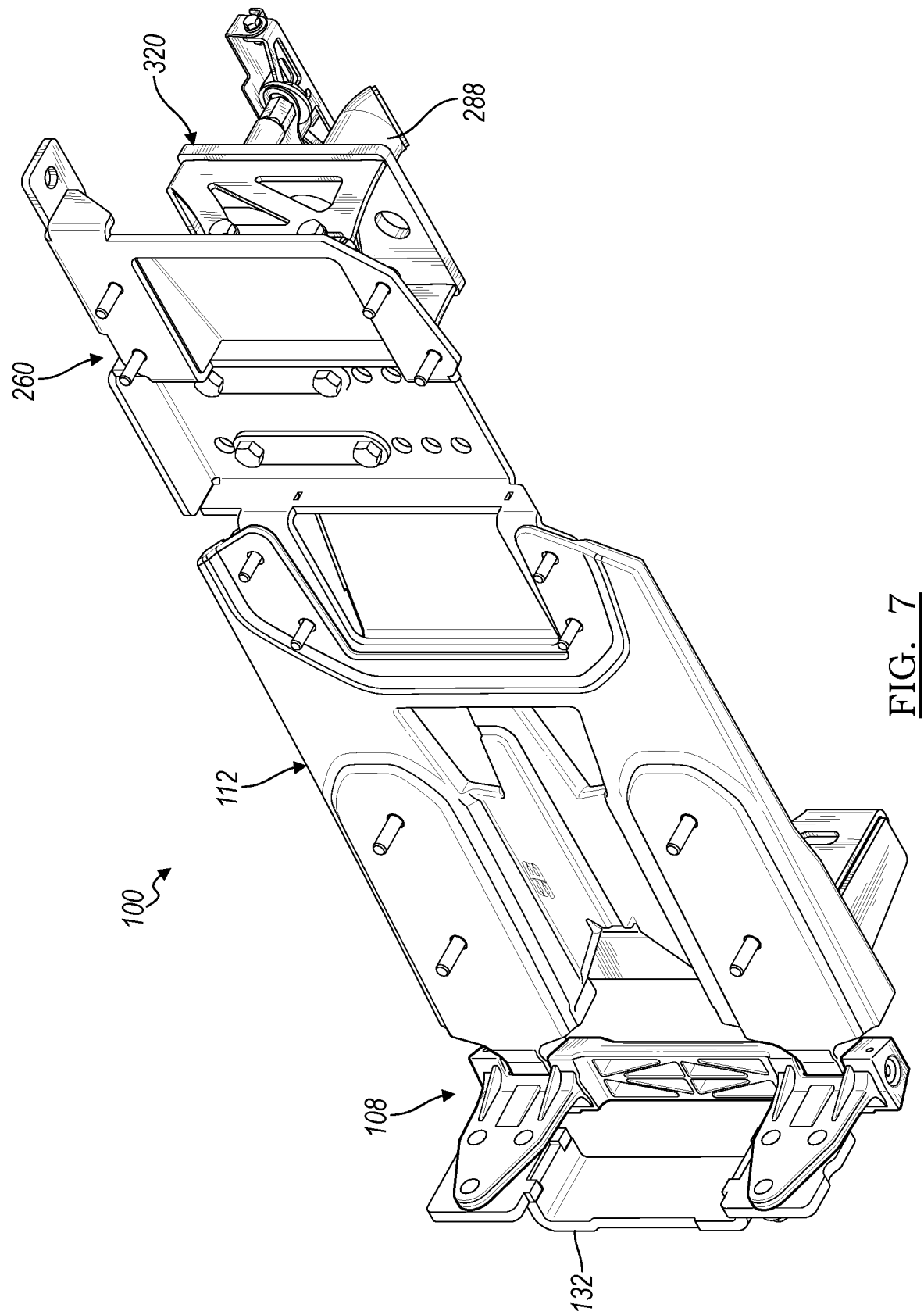
FIG. 7 is a bottom rear perspective view from the first side of wheel carrier bracket assembly.
Figure 16:
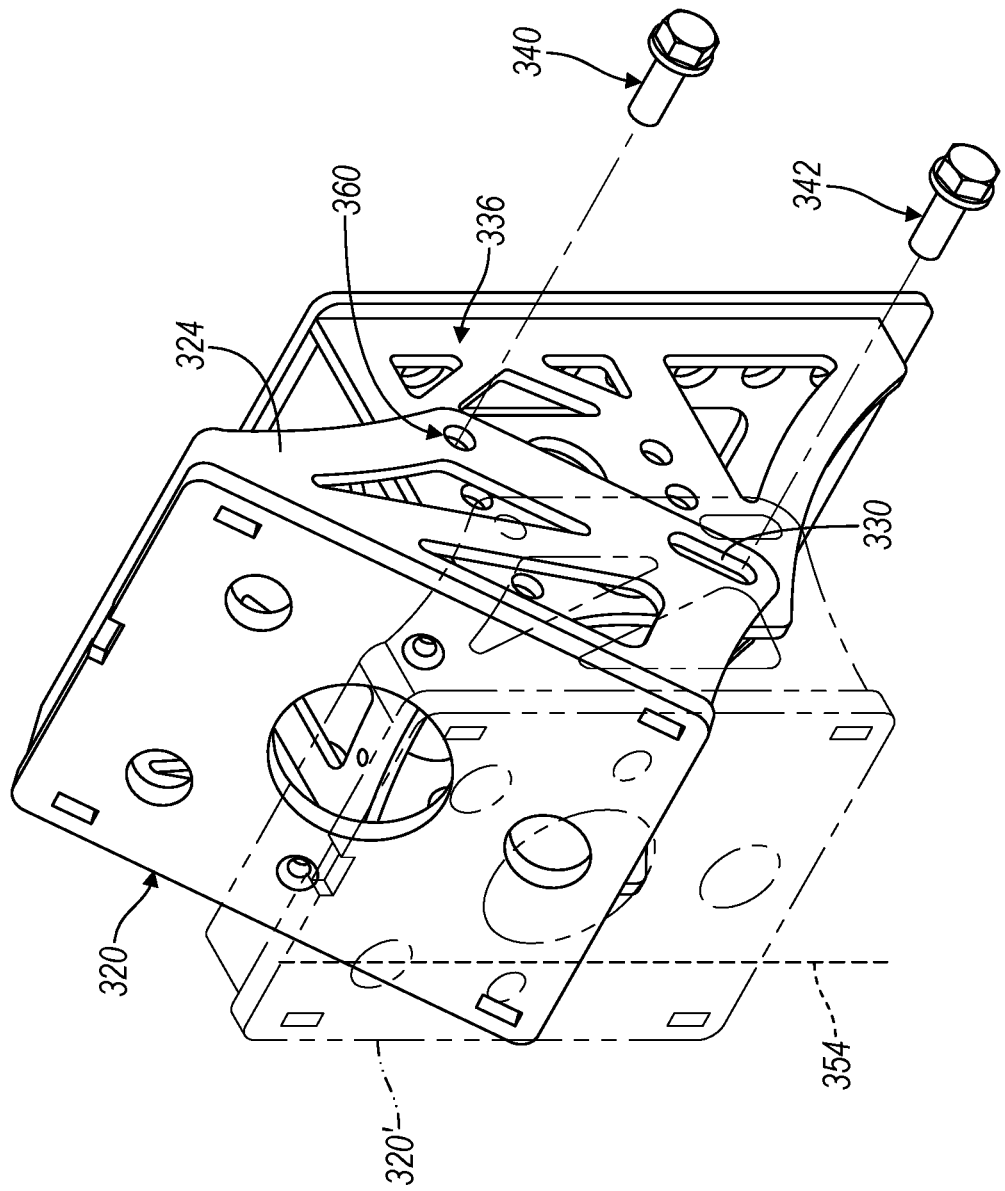
FIG. 16 is a detailed view of a wheel holder in an angled position.
Figure 17:
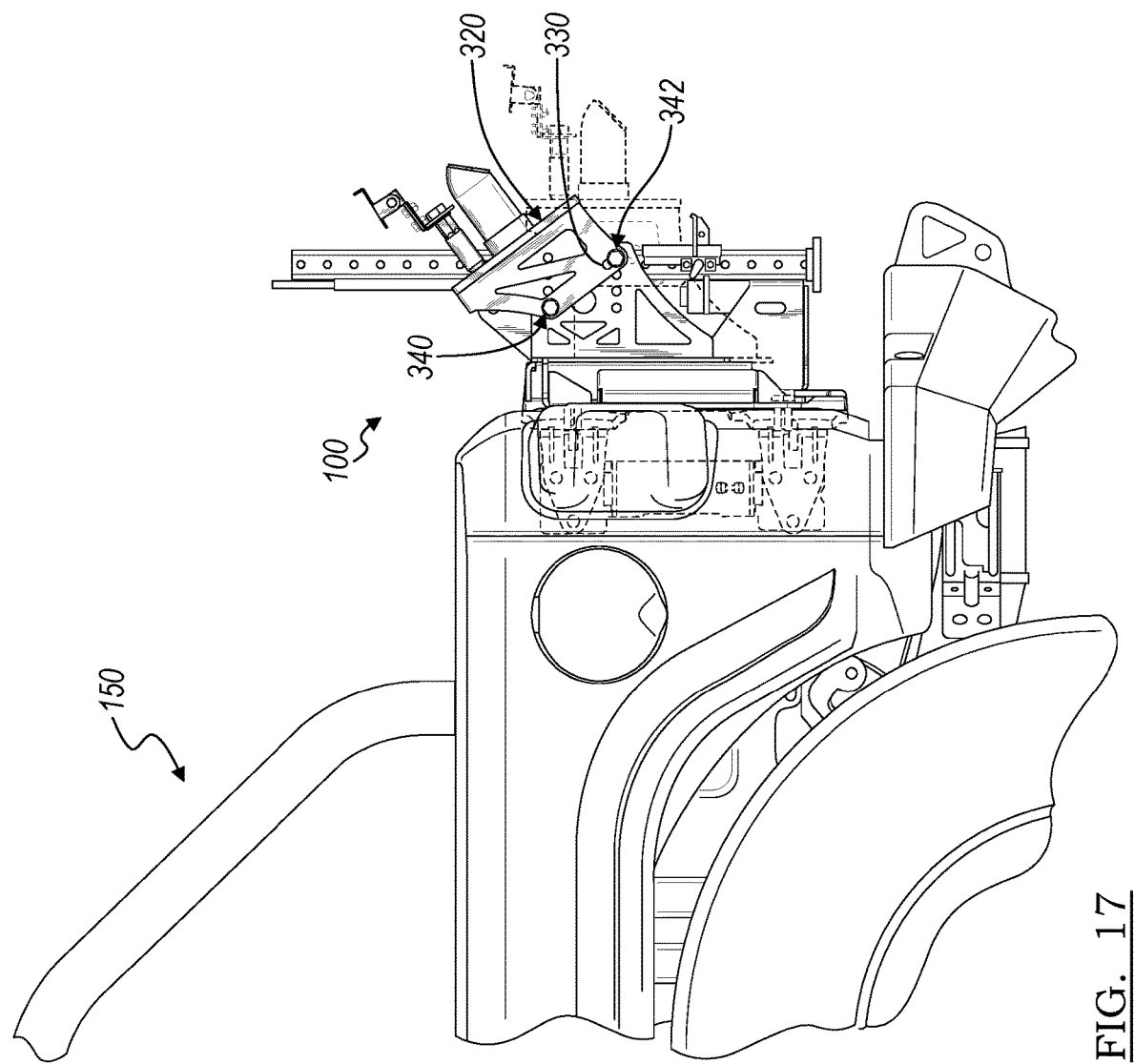
FIG. 17 is an assembled view of a wheel holder in an angled position.

The wheel carrier assembly portion 278 allows for adjustability or a change of an angle of the spare wheel 162 relative to the tailgate 120. As illustrated in FIG. 5 and FIG. 16, the wheel carrier assembly 278 may include a first or outer wheel carrier portion or bracket 320 that includes a side bracket or member 324. Formed through the side bracket member 324 a plurality of through bores 326. Formed on a second side or opposite to the through bores 326 may be a through groove or elongated hole 330. The outer bracket 320 may be connected to an inner bracket 336, such as with one or more fasteners 340. The inner bracket 336 may be fixed to the central bracket or portion 272 with one or more fasteners 344 passing through throughbores in the inner bracket 336 to interconnect with one or more fasteners or throughbores in the bracket portion 272. The elongated slot 330, as illustrated in FIGS. 5 and 16, may allow the wheel carrier portion 278 to rotate relative to the bracket portion 112, as discussed further herein.

Further, as illustrated in FIG. 1, the wheel carrier portion 278 may move up or down relative to the main bracket portion 112, such as generally in the direction of the double headed arrow 350. The carrier portion 278 may be moved relative to the bracket portion 272 by engaging different levels of the holes or bores 273. Selected fasteners 344 may be used to releasably fix the wheel carrier portion 278.

Figure 15:
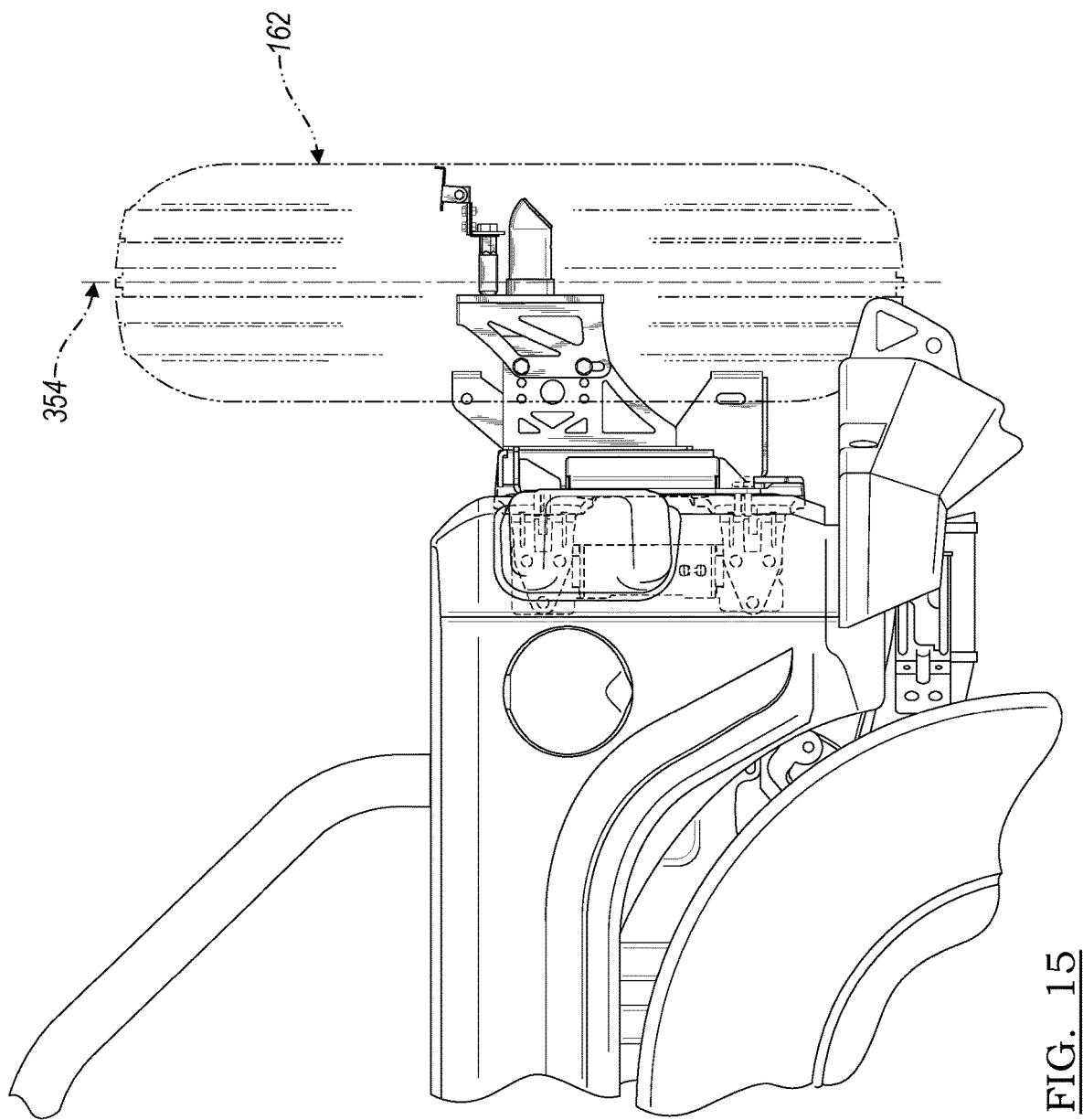
FIG. 15 is a detailed view of a mounted spare wheel on a wheel holder assembly.

As illustrated in FIG. 15, the wheel 162 may be held in a vertical position. When the carrier portion 320 has or is assembled such that an upper fastener 340 is substantially vertically aligned with a lower fastener 342 (e.g. within about 0.001 millimeters (mm) to about 1 mm from a common axis), the wheel 164 is substantially vertical. When vertical an axis 354, as illustrated in phantom in FIG. 16, defined by or parallel to the bracket 320' (illustrated in phantom) may be substantially normal to a ground surface or may be substantially parallel to a plane of the bracket member 112.

In various embodiments, however, the wheel carrier bracket 320 (FIG. 5) may be moved or tilted along a tilted axis 354' (FIG. 18) that is tilted or angled from the vertical axis 354, as illustrated in solid line in FIG. 16. To move or orient the bracket 320 to an angle relative to the vertical axis 354 the upper fastener 340 may be moved closer to the main bracket 112 and/or the tailgate 120 with an inner throughbore (i.e. a throughbore near the bracket portion 272) 360. The lower fastener 342, therefore, is positioned or moves within and/or relative to the elongated hole or bore 330, as illustrated in solid lines in FIG. 16 and in FIG. 17. It is understood that other positions may be used using the plurality of through bores in the bracket portion 336 to achieve the angle or tilt. Generally, the tilt is achieved when the upper fastener 340 is not aligned with the lower fastener 342, such as by an amount of greater than 1 mm from a common axis. In various embodiments, the distance may be greater than about 1 centimeter (cm), including about 1 cm to about 10 cm.

In this configuration a front or face plane of the wheel carrier 320 may be angled and is non-parallel to a face or plane of the plate bracket 112. Accordingly, as illustrated in FIG. 18, the axis 354 of the wheel 162 may be positioned at an angle relative to the plate 112 which is substantially non-parallel. Further, the axis 354 is substantially non-normal to a flat ground surface below the vehicle 150. The wheel carrier assembly 100, therefore, may allow for change in an angle of the wheel 162 relative to the vehicle 150 due to movement of at least one of the fasteners, such as the upper fastener 340, relative to the bracket portion such as an inner bracket portion 336.

With continuing reference to FIGS. 1-8 and 13-14 and additional reference to FIGS. 19-21, the tailgate 120 may move relative to the side panel 154, such as due to the hinge assembly 100. In various embodiments, therefore, the tailgate 120 may move around the hinge pin(s) 210 such that the tailgate 120 may swing relative to the side panel 154. Swinging motion of the tailgate 120 may apply a force relative to the side panel 154, including the side panel member 154a as illustrated in FIG. 14. The tailgate 120 may be moved between a closed position, as illustrated in FIG. 18 and FIG. 20, and an open position, as illustrated in FIG. 21, and vice versa. To open the tailgate 120, the tailgate 120 may move generally in the direction of arrow 395 around an axis 397 via the pins 210 due to the hinge assembly 104.

The side panel 154 may include or define an opening or a void 400. Extending or movable through the void 400 may be a door arm or control arm 404. The door arm 404 may extend or pass through a passage, such as the void 400 and/or other passages during movement of the tailgate 120.

During a selected movement, such as a maximum opening or travel of the tailgate 120, an end or stop portion 410 of the arm 404 may move relative to a passage of the vehicle 150, including a stop block or panel 414. As the arm 404 is connected to the tailgate 120, when the arm 404 stops the tailgate 120 also stops. A stop member 420, therefore, may be connected or incorporated with the arm 404 to assist in stopping or limiting travel of the tailgate 120.

In various embodiments, the stop or bumper portion 420 may be connected to the arm 404. The bumper or stop member 420 may include one or more bumper or engagement regions or portions, such as a first bumper 424 and a second bumper 428. The bumpers 424, 428 may be formed of a selected resilient or flexible material, such as rubber, silicone, polymer, or other appropriate materials. Further, the bumpers 424, 428 may define or form a selected surface area to engage a portion of the vehicle 150, such as the stop block 414 in a selected manner to disperse a force applied to the stop member 420.

The stop member 420 may be fixed to the arm 404 such as with a central connection or rod portion 432. The rod portion 432 may interconnect the two bumpers 424, 428 and allow for connection to the arm 404. For example, the arm 404 may define a slot or passage 438 through which the connection member 432 may pass or connected to assist in engaging or holding the stop member 420 to the arm 404. Accordingly, the stop member 420 may move with the arm 404 during movement of the tailgate 120. The stop member 420 may then engage a selected portion of the vehicle 150 to assist in stopping movement of the tailgate 120 by stopping movement or travel of the arm 404.

In various embodiments, for example with reference to FIG. 20 and FIG. 21, the stop member 420 may engage the stop block 414 in the open position of the tailgate 120, as illustrated in FIG. 21. In particular, as discussed above, the bracket assembly 110 may be used to carry a large and/or massive portion, such as the spare wheel 162. Thus, when opening the tailgate 120, a large force may exist due to the movement of the tailgate 120. The stop portion 420 may engage the stop block 414 to assist in holding or stopping the tailgate 120 from passing a selected position relative to the vehicle 150.

As illustrated in FIG. 20, the control bar 404 may extend into an internal forward area of the vehicle, such as near or adjacent to the taillight, and pass through the hole or bore 400 in the vehicle panel 154a. The control bar 404 may move with the tailgate 120 when it is attached to the tailgate 120. Generally, the control bar 404 is fixed to the tailgate 120 in a generally known manner. The control bar 404 may move through the stop block 414 and engage various portions thereon to provide detents or stops of the door 120 or to hold the door 120 relative to the vehicle. However, at a maximum travel of the bar 404, such as relating to a maximum selected travel of the tailgate 120, the end 410 of the bar 404 may move near or adjacent to the stop block 414 by passing through the stop block 414. The stop member 420 may engage the stop block 414. Thus, the stop block 420 may be engaged to the stop block 414 to stop movement of the door 120 in a selected direction, such as in an open direction, and may also include the various force absorbing ends or bumpers 424, 428, as discussed above, to dampen stopping the door member 120.

Accordingly, as discussed above, the bracket assembly 120 may be connected to the tailgate 120 of the vehicle 150 for various purposes. The main bracket 112 may be connected to the tailgate 120 and the hinge portion 108 may be fixed to the panel 154a. Additionally, the support bracket 132 may be mounted opposite of the panel 154a to reinforce the mounting bores or positions of the hinge portion 108. The main bracket in combination with the hinge portion 108 may provide a hinge assembly for the tailgate 120 relative to the vehicle 150. This allows the tailgate 120 to swing relative to other portions of the vehicle and carry the selected load.

Further, items may be mounted to the main bracket 112, such as the spare wheel 162, of a selected mass to the main bracket 112, through the wheel carrier bracket assembly, as discussed above. Due to the mounting, the force is carried on the hinge portion 108 due to the ears or hinge portions 190, 194 of the main bracket 112 connecting to the hinge portion 108. Further, the stop portion 420 connected to the control bar 404 may assist in controlling or dampening a selected motion of the door 120 in a selected direction, such as stopping of the tailgate 120 past a maximum selected open position.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hinge and bracket assembly, comprising:
a main bracket member configured to be connected to a first body member;
a hinge vehicle connection member having a first connection end and a second connection end and configured to be connected to a second body member and hingedly coupled to the main bracket member; and
a body reinforcement member separate from the hinge vehicle connection member and configured to (i) be selectively coupled to the hinge vehicle connection member and (ii) reinforce the second body member;
a stop arm extending from a first body panel; and
a stop member extending from the stop arm;
wherein the stop member is configured to engage at least the body reinforcement member to stop movement of the first body panel in a first direction;
wherein the stop arm extending defines a stop member engagement region;
wherein the stop member extends from a surface of the stop arm to engage a region;
wherein the hinge vehicle connection member when coupled to the second body member and the body reinforcement member is operable to support and carry the main bracket member and a separate member coupled to the main bracket member during movement of the first body member relative to the second body member.

2. The hinge and bracket assembly of claim 1, further comprising:
a pin member configured to hingedly interconnect the main bracket member and the hinge vehicle connection member;
wherein the main bracket member is operable to pivot relative to the hinge vehicle connection member.

3. The hinge and bracket assembly of claim 1, further comprising:
a member carrier assembly, wherein the member carrier assembly comprises:
a first bracket portion configured to carry the separate member, wherein the separate member includes a wheel; and
a second bracket portion;
wherein the first bracket portion is operable to move relative to the second bracket portion.

4. The hinge and bracket assembly of claim 3, wherein the first bracket portion is configured to move relative to the second bracket portion to move the wheel to one of a plurality of positions relative to the main bracket portion.

5. The hinge and bracket assembly of claim 3,
wherein the first bracket member includes a first plurality of bores;
wherein the second bracket member includes a second plurality of bores;
wherein the first bracket member is configured to be positioned relative to the second bracket member in at least a first angular position and a second angular position;
wherein in the first angular position at least a first fastener is configured to connect the first bracket member and the second bracket member via a first bore of the first plurality of bores and a second bore of the second plurality of bores and a second fastener is configured to connect a third bore of the first plurality of bores and a fourth bore of the second plurality of bores;
wherein in the second angular position at least the second fastener is configured to connect the third bore of the first plurality of bores and a fifth bore of the second plurality of bores.

6. The hinge and bracket assembly of claim 5, wherein the third bore is an elongated bore.

7. The hinge and bracket assembly of claim 1, wherein the body reinforcement member extends between the first connection end and the second connection end.

8. The hinge and bracket assembly of claim 1, wherein the main bracket member is configured to be (i) hingedly connected to the hinge vehicle connection member and (ii) fixedly connected to a vehicle body panel.

9. A hinge and wheel carrier assembly, comprising:
a main bracket member configured to be mounted to a first body panel, wherein the main bracket member includes a first bracket connection portion and a second bracket connection portion;
a hinge connection member configured to be mounted to a second body panel, wherein the hinge connection member is a single member that includes a first hinge connection portion and a second hinge connection portion, wherein the first hinge connection portion is configured to hingedly connect to the first bracket connection portion and the second hinge connection portion is configured to hingedly connect to the second bracket connection portion;
a wheel carrier assembly, comprising (i) a first bracket portion fixedly connected to the main bracket member, (ii) a second bracket portion moveably connected to the first bracket portion, and (iii) a wheel mounting portion;
a body reinforcement member configured to be connected to the hinge connection member;
a stop arm moveable with the first body panel; and
a stop member extending from the stop arm;
wherein the stop member is configured to engage at least the body reinforcement member to stop movement of the first body panel in a first direction;
wherein the second bracket portion is configured to position a wheel mounted on the wheel mounting portion in at least two positions relative to the first bracket portion.

10. The hinge and wheel carrier assembly of claim 9, wherein the second bracket portion comprises a first member and a second member.

11. The hinge and wheel carrier assembly of claim 10, wherein the first member is configured to move along an axis relative to the first bracket portion.

12. The hinge and wheel carrier assembly of claim 10, wherein the first member is configured to move to a plurality of angular positions relative to the second member at least by coupling different bores of the first member and the second member in each angular position of the plurality of angular positions.

13. The hinge and wheel carrier assembly of claim 9, wherein the wheel mounting portion is configured to hold the wheel at a first position and a second position relative to the main bracket member.

14. A hinge and bracket assembly configured to be connected to a vehicle, comprising:
a main bracket member configured to be connected to a first body portion of the vehicle;
a hinge member having a first connection end and a second connection end and configured to be connected to a first side of a second body portion of the vehicle;
a body reinforcement member configured to be connected to a second side of the second body portion of the vehicle;
a stop arm extending from the first body portion and moveable with the first body portion; and
a stop member extending from the stop arm;
wherein the first body portion is configured to move relative to the second body portion;
wherein the stop member is configured to engage at least the body reinforcement member to stop movement of the first body portion in a first direction.

15. The hinge and bracket assembly of claim 14, wherein the stop member comprises:
an elongated member configured to be connected to the stop arm; and
an abutment portion formed with the elongated member.

16. The hinge and bracket assembly of claim 15, wherein the abutment portion is positioned at a first end of the elongated member;
wherein the second side of the second body portion is opposite the first side of the second body portion.

17. The hinge and bracket assembly of claim 15, wherein the abutment portion includes a first abutment portion positioned at a first end of the elongated member and a second abutment portion positioned at a second end of the elongated member.

* * * * *